United States Patent
Hirose

(10) Patent No.: US 8,964,061 B2
(45) Date of Patent: Feb. 24, 2015

(54) IMAGE CAPTURING APPARATUS WITH SELECTION OF THINNING AND READOUT MODE IN ACCORDANCE WITH MOVING IMAGE RECORDING MODE

(75) Inventor: Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/143,223

(22) PCT Filed: Jan. 6, 2010

(86) PCT No.: PCT/JP2010/050298
§ 371 (c)(1),
(2), (4) Date: Jul. 5, 2011

(87) PCT Pub. No.: WO2010/090056
PCT Pub. Date: Aug. 12, 2010

(65) Prior Publication Data
US 2011/0267533 A1    Nov. 3, 2011

(30) Foreign Application Priority Data

Feb. 6, 2009 (JP) .................... 2009-026688

(51) Int. Cl.
*H04N 5/235* (2006.01)
*H04N 9/04* (2006.01)
(Continued)

(52) U.S. Cl.
CPC ........... *H04N 9/045* (2013.01); *H04N 5/23212* (2013.01); *H04N 5/343* (2013.01); *H04N 5/3458* (2013.01)
USPC .......................... 348/230.1; 348/345; 348/349

(58) Field of Classification Search
USPC ....................... 348/345, 349, 230.1
See application file for complete search history.

(56) References Cited

U.S. PATENT DOCUMENTS 6,819,360 B1    11/2004    Ide et al.
6,829,008 B1    12/2004    Kondo et al.
(Continued)

FOREIGN PATENT DOCUMENTS

CN    101326814 A    12/2008
EP    0981245 A2    2/2000
(Continued)

OTHER PUBLICATIONS

Feb. 16, 2010 International Search Report and Written Opinion in International Patent Appln. No. PCT/JP2010/050298.
(Continued)

*Primary Examiner* — Antoinette Spinks
(74) *Attorney, Agent, or Firm* — Fitzpatrick, Cella, Harper & Scinto

(57) ABSTRACT

An image capturing apparatus is provided with an image sensor that has a first pixel group and a second pixel group, a focus adjustment unit that executes focus adjustment of an imaging lens based on the signal from the second pixel group, a readout unit that has a first thinning and readout mode that thins and reads out signals from the plurality of pixels at a predetermined thinning ratio and thinning phase, and a second thinning and readout mode that thins and reads out signals from the plurality of pixels with a difference in at least one of the thinning ratio and the thinning phase from the first thinning and readout mode, and a selecting unit that selects in which mode to operate the readout means from among the first and second thinning and readout modes in accordance with the state of the image capturing apparatus.

6 Claims, 15 Drawing Sheets

(51) Int. Cl.
*H04N 5/232* (2006.01)
*H04N 5/343* (2011.01)
*H04N 5/345* (2011.01)

(56) References Cited

U.S. PATENT DOCUMENTS

| | | | |
|---|---|---|---|
| 7,358,999 | B2 | 4/2008 | Ikeda |
| 2003/0193600 | A1 | 10/2003 | Kitamura et al. |
| 2004/0207747 | A1 | 10/2004 | Ikeda |
| 2008/0112643 | A1 | 5/2008 | Kusaka |
| 2009/0140122 | A1* | 6/2009 | Suzuki ............... 250/201.2 |
| 2010/0177236 | A1 | 7/2010 | Suzuki et al. |

FOREIGN PATENT DOCUMENTS

| | | |
|---|---|---|
| EP | 1791344 A2 | 5/2007 |
| JP | 60-4915 A | 1/1985 |
| JP | 11-258491 A | 9/1999 |
| JP | 11-258492 A | 9/1999 |
| JP | 2000-156823 A | 6/2000 |
| JP | 2000-292686 A | 10/2000 |
| JP | 2003-348437 A | 12/2003 |
| JP | 2007-140176 A | 6/2007 |
| WO | 2008/023706 A1 | 2/2008 |

OTHER PUBLICATIONS

May 13, 2013 Chinese Official Action in Chinese Patent Appln. No. 201080006992.9.

May 20, 2013 Japanese Official Action in Japanese Patent Application No. 2009-026688.

Feb. 13, 2013 European Search Report in European Patent Appln. No. 10738395.2.

* cited by examiner

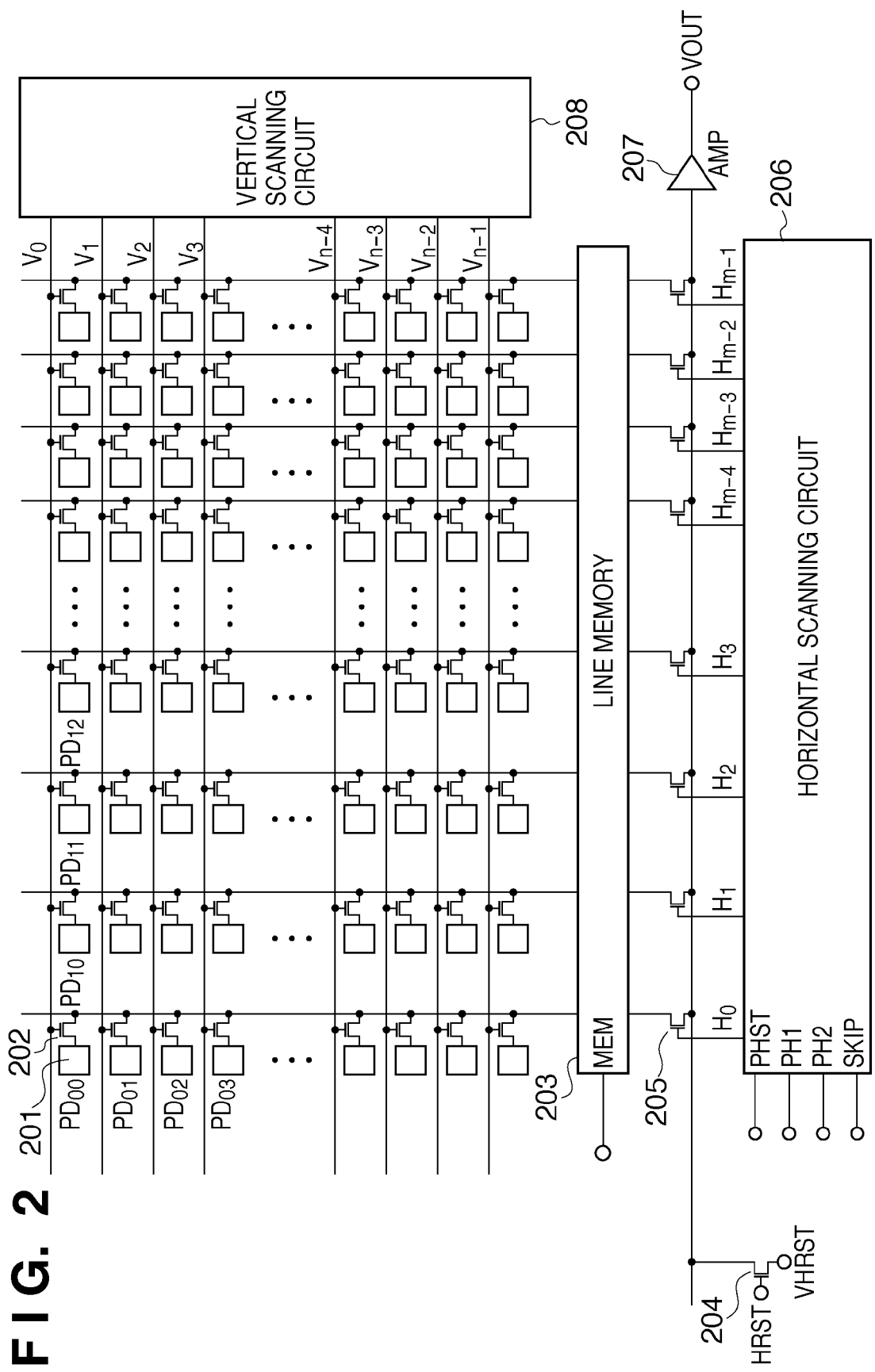

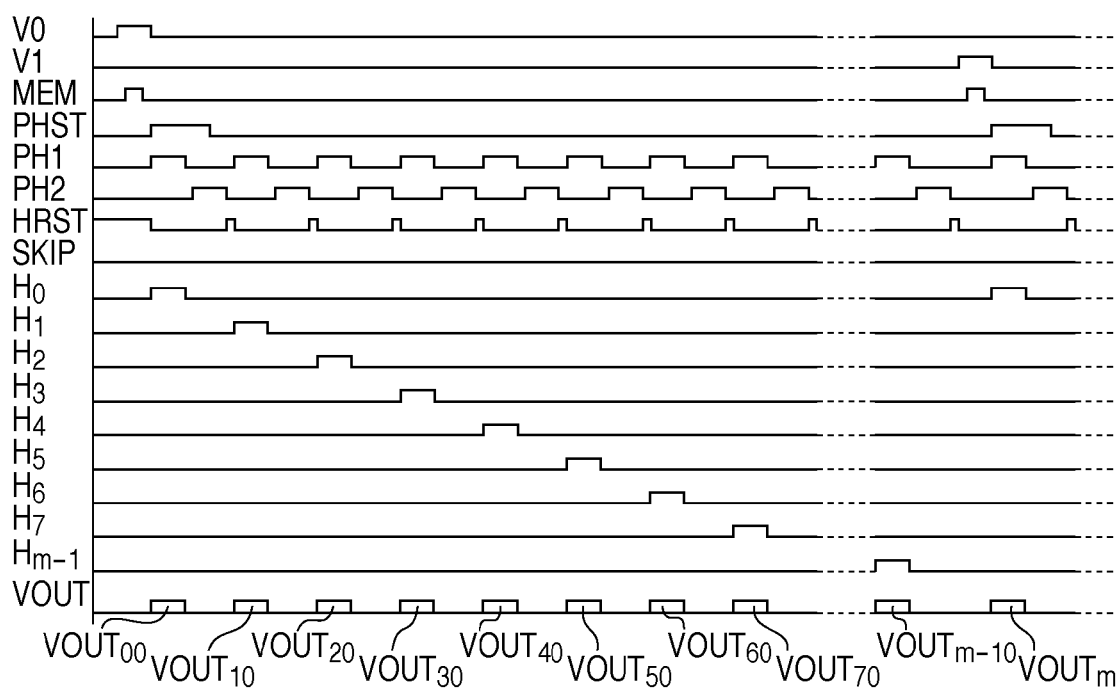

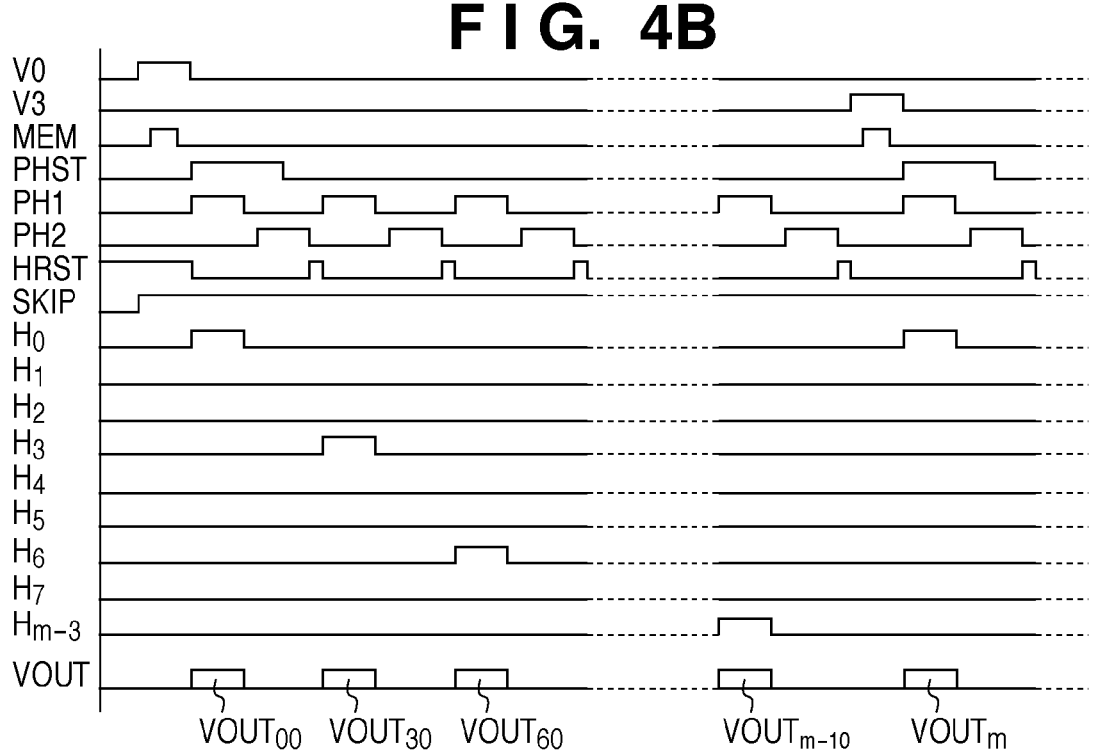

PLANAR DIAGRAM      A-A CROSS-SECTIONAL DIAGRAM

PLANAR DIAGRAM    A-A CROSS-SECTIONAL DIAGRAM

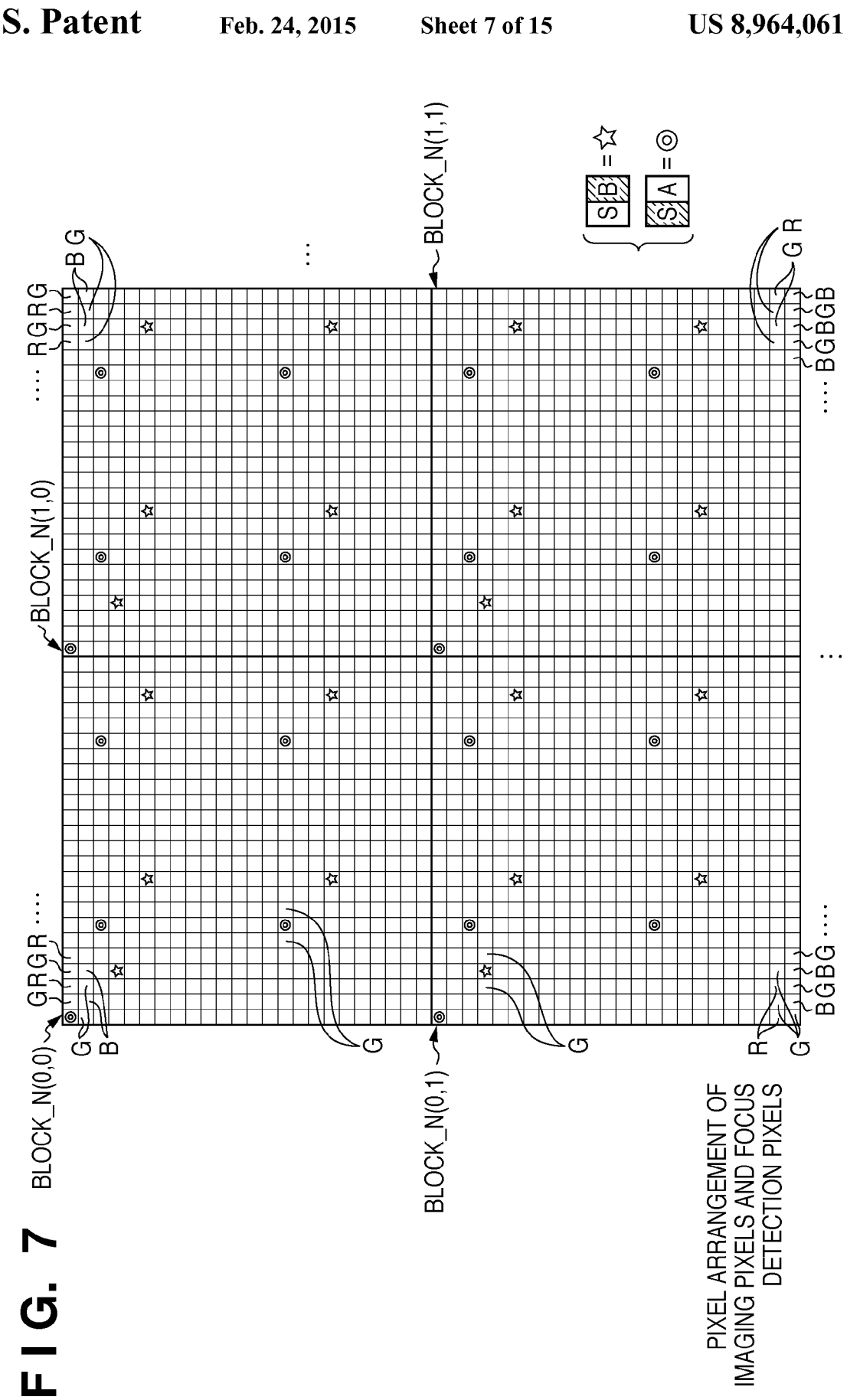
FIG. 7 PIXEL ARRANGEMENT OF IMAGING PIXELS AND FOCUS DETECTION PIXELS

FIG. 10A

THINNING AND READOUT PATTERN
IN IMAGE QUALITY PRIORITY AF MODE

FIG. 10B

THINNING AND READOUT PATTERN IN HIGH IMAGE-QUALITY MODE

FIG. 10C

THINNING AND READOUT PATTERN IN HIGH-PRECISION AF MODE

FIG. 11

BLOCK_N(0,0)

PIXEL ARRANGEMENT OF IMAGING PIXELS AND FOCUS DETECTION PIXELS
(FOR VARIABLE THINNING RATIO)

F I G. 12A

BLOCK_N(0,0)

THINNING AND READOUT PATTERN IN IMAGE QUALITY PRIORITY AF MODE

THINNING AND READOUT PATTERN IN HIGH-PRECISION AF MODE

IMAGE CAPTURING APPARATUS WITH SELECTION OF THINNING AND READOUT MODE IN ACCORDANCE WITH MOVING IMAGE RECORDING MODE

TECHNICAL FIELD

The present invention relates to a control technique for reading out a pixel signal of an image capturing apparatus that has a focus detection pixel in a portion of the image sensor.

BACKGROUND ART

Some current image capturing devices that have a solid-state image sensor such as a CCD or CMOS sensor have a live view function. A live view function is a function that allows confirmation of an object image by sequentially outputting an image signal that is continuously read out from an image sensor onto a display device such as a liquid crystal display or the like arranged on the rear surface or elsewhere on a camera. Also, as a common method of using a light beam that passes through an imaging lens in an auto focus detection/adjustment method of an image capturing device, there is a contrast detection method (called a blur method) and a phase difference detection method (called a deviance method).

The contrast detection method is a method that is often used in a moving image capturing video movie device (camcorder) or digital still camera, wherein an image sensor is used as a focus detection sensor. In this method, an output signal of an image sensor, particularly information of a high-frequency component (contrast information) is focused on, and an imaging lens position for which that evaluation value becomes largest is set as a focus position. However, because an evaluation value is determined while moving the imaging lens in small amounts, and because it is necessary to move the lens until an evaluation value is determined with certainty to be the maximum, this method is not suitable for high-speed focus adjustment operation, and is also called a mountain-climbing method.

The phase difference method, on the other hand, is often used in single-lens reflex cameras that use silver halide film, and is the technique that contributes most to the practical use of the auto focus detection (Auto Focus: AF) single-lens reflex camera. In the phase difference method, a light beam that passes through a projection pupil of an imaging lens is split into two, and each of the split light beams are received by a pair of focus detection sensors. The amount of deviation in the focus direction of the imaging lens is then directly determined by detecting the amount of deviation in the signals output based on the amount of received light, that is, the amount of relative positional deviation in the direction the light beam was split. Therefore, the amount and direction of focus deviation can be obtained by executing an integration operation once by the focus detection sensors, and a high-speed focus adjustment operation becomes possible. However, in order to split the light beam that has passed through the projection pupil of the imaging lens into two and obtain a signal corresponding to each light beam, it is common to provide a light path splitting means such as a quick-return mirror or half-mirror in the imaging light path, and to provide a focus detection optical system and AF sensor in front. For this reason, there is the disadvantage that the apparatus becomes large and expensive. There is also the disadvantage that operation cannot be done during live view since the quick-return mirror is retreated.

In order to eliminate the aforementioned disadvantages, a technique to provide an image sensor with a phase difference detection function and to realize high-speed phase difference AF without the need for a dedicated AF sensor has been proposed. For example, in Japanese Patent Laid-Open No. 2000-156823, a pupil splitting function is provided to a portion of photoreceptors (pixels) of an image sensor by de-centering a sensitivity region of a photoreceiving unit from the light axis of an on-chip microlens. Phase difference focus detection is then executed by arranging these pixels as focus detection pixels at predetermined intervals between a group of imaging pixels. Because the locations at which the focus detection pixels are arranged correspond to defective portions of the imaging pixels, image information is created by interpolation from surrounding imaging pixel information.

Furthermore, in Japanese Patent Laid-Open No. 2000-292686, a pupil splitting function is provided by splitting a photoreceiving unit of a portion of pixels of an image sensor into two. Phase difference focus detection is then executed by arranging these pixels as focus detection pixels at predetermined intervals between a group of imaging pixels. In this technique as well, because the locations at which the focus detection pixels are arranged correspond to defective portions of the imaging pixels, image information is created by interpolation from surrounding imaging pixel information.

However, because image information is created by interpolation from surrounding imaging pixels at locations at which focus detection pixels are arranged and that are defective portions of the imaging pixels in the aforementioned Japanese Patent Laid-Open No. 2000-156823 and Japanese Patent Laid-Open No. 2000-292686, there are cases in which interpolation cannot be done properly, depending on the object. For this reason, although the deterioration in image quality is small in the case that the number of focus detection pixels is small compared to the number of normal imaging pixels, there is the problem that the deterioration in image quality becomes large with the increase in the proportion of focus detection pixels.

Also, in the case that live view is executed, it is necessary to perform read out from the image sensor at high speed in order to realize a target frame rate, and a method of thinning out a portion of the pixels of the image sensor and performing readout at high speed in order to achieve this is known. However, when pixel arrangement is done such that focus detection pixels are included in the read out pixel signal, the proportion of focus detection pixels with respect to imaging pixels increases in comparison to a case in which all pixels are read, and the effect on image quality becomes large.

With respect to the aforementioned problem, the following proposal is given by Japanese Patent Laid-Open No. 2000-156823. That is, when thinning out and reading out, live view is executed in a state in which the focus detection pixels are not read out, and when auto focus adjustment is executed, live view is terminated, and the focus detection pixels are read out. However, Japanese Patent Laid-Open No. 2000-156823 has the problem that because the focus detection pixels are not read out when a portion of the pixels of the image sensor are thinned out and read out at high speed, auto focus adjustment cannot be executed while executing live view.

DISCLOSURE OF INVENTION

The present invention was made in consideration of the aforementioned problems, and suppresses deterioration in image quality caused by focus detection pixels when thinning and reading out a pixel signal from an image sensor in an image capturing apparatus that has an image sensor with discretely arranged focus detection pixels.

According to a first aspect of the present invention, an image capturing apparatus comprises an image sensor in which a plurality of pixels are two-dimensionally arrayed in the horizontal direction and vertical direction, and has a first pixel group that photoelectrically converts an object image formed by an imaging lens and generates a first signal for image generation, and a second pixel group that is discretely arranged between a plurality of pixels comprising the first pixel group, splits the pupil region of the imaging lens, photoelectrically converts the object image from the split pupil region, and generates a second signal for phase difference detection, a focus adjusting means that detects the focus state of the imaging lens based on the second signal from the second pixel group and executes focus adjustment of the imaging lens, a readout means that has a first thinning and readout mode that thins and reads out signals from the plurality of pixels arranged in the horizontal direction and vertical direction at a predetermined thinning ratio and thinning phase, and a second thinning and readout mode that thins and reads out signals from the plurality of pixels with a difference in at least one of the thinning ratio and the thinning phase from the first thinning and readout mode, and a selecting means that selects in which mode to operate the readout means from among the first thinning and readout mode and the second thinning and readout mode in accordance with the state of the image capturing apparatus.

Further features of the present invention will become apparent from the following description of exemplary embodiments with reference to the attached drawings.

BRIEF DESCRIPTION OF DRAWINGS

FIG. 2 is a block diagram of a solid-state image sensor of an embodiment of the present invention.

FIGS. 3A, 3B are explanatory diagrams for readout of all pixels of an embodiment of the present invention.

FIGS. 4A, 4B are explanatory diagrams for thinning and readout of an embodiment of the present invention.

FIG. 7 is an explanatory diagram of an arrangement pattern of focus detection pixels of an embodiment of the present invention.

FIG. 10A is an explanatory diagram illustrating a thinning and readout pattern of an embodiment of the present invention.

FIG. 10B is an explanatory diagram illustrating a thinning and readout pattern of an embodiment of the present invention.

FIG. 10C is an explanatory diagram illustrating a thinning and readout pattern of an embodiment of the present invention.

FIG. 11 is an explanatory diagram of an arrangement pattern of focus detection pixels of an embodiment of the present invention.

FIG. 12A is an explanatory diagram illustrating a thinning and readout pattern of an embodiment of the present invention.

BEST MODE FOR CARRYING OUT THE INVENTION

Hereinafter, an embodiment of the present invention will be explained in detail with reference to the drawings.

Figure 1:
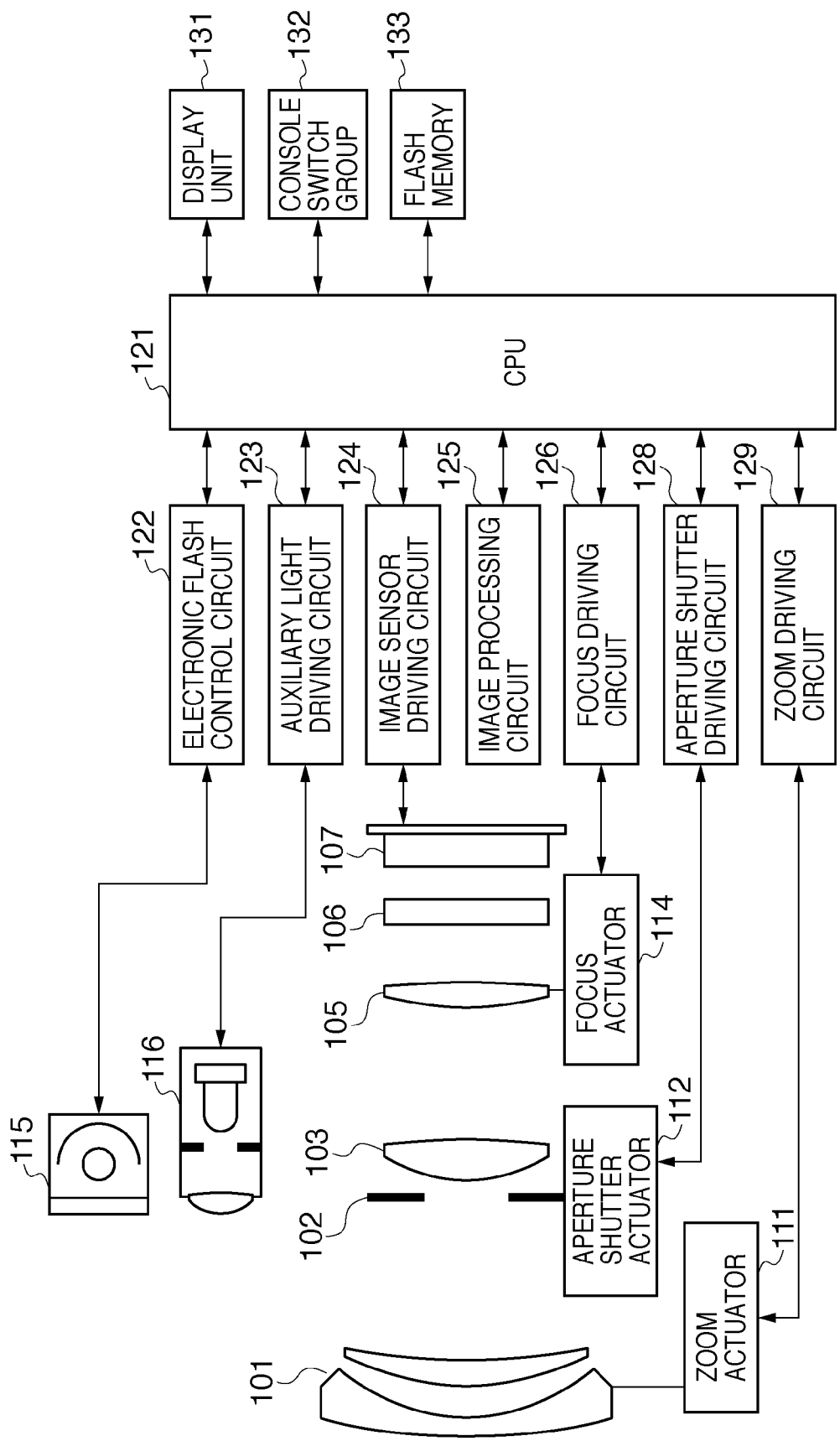
FIG. 1 is a structural diagram of a camera according to an embodiment of the present invention.

FIG. 1 is a structural diagram of a camera as an image capturing device according to an embodiment of the present invention, and illustrates a digital camera in which a camera main body that has an image sensor and an imaging lens are combined as a unit. In FIG. 1, reference numeral 101 is a first lens group arranged at the end of an imaging optical system (image forming optical system), and is held to be movable in the direction of the light axis. Reference numeral 102 is a dual-purpose aperture and shutter, and in addition to executing adjustment of the amount of light during image capture by adjusting the diameter of the opening thereof, moves as a shutter for adjustment of the exposure time during still image capture. Reference numeral 103 is a second lens group. The dual-purpose aperture and shutter 102 and second lens group 103 move as a unit in the direction of the light axis, and realize a magnification action (zoom function) by working with the movement of the first lens group 101.

Reference numeral 105 is a third lens group, and executes focus adjustment by moving in the direction of the light axis. Reference numeral 106 is an optical low pass filter, and is an optical element for reducing false color and moiré in a captured image. Reference numeral 107 is an image sensor comprised of a CMOS sensor and a peripheral circuit thereof The image sensor 107 is a two-dimensional single-panel color sensor in which primary color mosaic filters arranged in a Bayer array are formed on-chip on photoreceptive pixels arranged in a two-dimensional array with m pixels in the horizontal direction and n pixels in the vertical direction. Reference numeral 111 is a zoom actuator, and drives the first lens group 101, second lens group 103 and everything in between in the direction of the light axis by rotating an unshown cam tube to execute a magnifying operation. Reference numeral 112 is an aperture shutter actuator, and in addition to controlling the opening diameter of the dual-purpose aperture and shutter 102 to adjust the amount of imaging light, executes exposure-time control of the time of still image capture. Reference numeral 114 is a focus actuator, and drives the third lens group 105 to move in the direction of the light axis to execute focus adjustment.

Reference numeral 115 is an electronic flash for illuminating an object during image capture, and although it is preferably a flash lighting device that uses a xenon tube, an illumination device provided with an LED that continuously emits light may also be used. Reference numeral 116 is an AF auxiliary lighting device that projects a mask image that has a predetermined opening pattern through a projection lens onto an object region, and improves the focus detection capability for a dark object or an object that has low contrast. Reference numeral 121 is a CPU inside the camera that presides over various control of the camera main body. The CPU 121 has a computation unit, ROM, RAM, A/D converter, D/A converter, and communication interface circuit, etc., drives each circuit in the camera based on a predetermined program stored in the ROM, and executes a sequence of operations such as AF, image capture, image processing, and recording, etc.

Reference numeral 122 is an electronic flash control circuit that controls the lighting of the electronic flash 115 in synchronization with an image capturing operation. Reference numeral 123 is an auxiliary light driving circuit that controls the lighting of the AF auxiliary lighting device 116 in synchronization with a focus detection operation. Reference numeral 124 is an image sensor driving circuit that controls the imaging operation of the image sensor 107, and also performs A/D conversion on the obtained image signal and sends it to the CPU 121. Reference numeral 125 is an image processing circuit that executes processing such as γ conversion, color interpolation, and JPEG compression, etc., on the image obtained by the image sensor 107. Reference numeral 126 is a focus driving circuit that performs drive control of the focus actuator 114 based on a focus detection result, and executes focus adjustment by driving the third lens group 105 to move in the direction of the light axis. Reference numeral 128 is an aperture shutter driving circuit that performs drive control of the aperture shutter actuator 112 to control the opening of the dual-purpose aperture and shutter 102. Reference numeral 129 is a zoom driving circuit that drives the zoom actuator 111 in accordance with a zoom operation of the photographer.

Reference numeral 131 is a display device such as an LCD, and displays information relating to the image capturing mode of the camera, a preview image before image capture and confirmation image after capture, and a display image in a focused state during focus detection, etc. Reference numeral 132 is a group of operational switches comprised of a power switch, release (image capture trigger) switch, zoom operation switch, and image capturing mode selection switch, etc. Reference numeral 133 is a detachable flash memory that records a captured image.

FIG. 2 illustrates a block diagram of an image sensor according to an embodiment of the present invention. Moreover, the block diagram in FIG. 2 illustrates the minimum structure needed to explain the aforementioned readout operation, and a pixel reset signal, etc., is omitted. In FIG. 2, reference numeral 201 is a photoelectric converter (hereinafter called a PDmn. m is the address in the X direction where m=0, 1, ..., m−1, and n is the address in the Y direction, where n=0, 1, ..., n−1). The photoelectric converter 201 is comprised of a photodiode, pixel amp, and switch for reset, etc. Also, the image sensor of the present embodiment is comprised of photoelectric converters arranged in a two-dimensional m×n array. Due to the complexity of the arrangement, only the upper-left photoelectric converter PD00 is given a reference numeral.

Reference numeral 202 is a switch to select the output of a photoelectric converter PDmn, and each row is selected by a vertical scanning circuit 208, to be described later. Reference numeral 203 is a line memory for temporarily storing the output of the photoelectric converter PDmn, and stores the outputs of a line of photoelectric converters 201 selected by the vertical scanning circuit. A condenser is normally used. Connected to a horizontal output line, reference numeral 204 is a switch used to reset the horizontal output line to a predetermined potential VHRST, and is controlled by a signal HRST. Reference numeral 205 is a switch for sequentially outputting the output of the photoelectric converter PDmn stored in the aforementioned line memory 203 to the horizontal output line, and the outputs of a line of photoelectric converters are read out by sequentially scanning the switches from H0 to Hm−1 by a horizontal scanning circuit 206 to be described later.

Reference numeral 206 is a horizontal scanning circuit that sequentially scans the outputs of the photoelectric converters stored in the line memory, and outputs them to the horizontal output line. The signal PHST is data input to the horizontal scanning circuit, while PH1 and PH2 are shift block inputs, and data is set when PH1=H, and data is latched in the case of PH2. It is possible to sequentially shift PHST by inputting a shift block to PH1, PH2, and sequentially turn on the switches from H0 to Hm−1. SKIP is a control terminal input that causes execution of a setting during thinning and readout, to be described later. By setting the SKIP terminal to the H level, it becomes possible to skip the horizontal scanning circuit in a predetermined interval. Details regarding the readout operation will be described later.

Reference numeral 207 is an amp that amplifies the signal read out by the horizontal scanning circuit. In addition, reference numeral 208 is a vertical scanning circuit, and it is possible to select the selection switch 202 of a photoelectric converter PDmn by performing sequential scanning and performing output from V0 to Vn−1. Similarly to the horizontal scanning circuit, a control signal is controlled by a data input PVST, shift block PV1, PV2, and thinning and readout setting SKIP. Because the operation is the same as in the horizontal scanning circuit, a detailed explanation thereof is omitted. Also, the aforementioned control signal is not shown in the figure.

FIGS. 3A and 3B are explanatory diagrams in the case that all the pixels of the image sensor in FIG. 2 are read out. FIG. 3A is a portion illustrating the arrangement of m×n photoelectric converters. The R, G and B signals marked in the figure represent color filters coated on the photoelectric converters. The present embodiment will be explained using a Bayer array, in which of four pixels arranged in 2 rows×2 columns, two pixels having G (green) color sensitivity are arranged diagonally, and one pixel each having R (red) and B (blue) color sensitivity are arranged in the other two pixels. The numbers written at the top and to the left in the figure are X and Y numbers. Pixels through which diagonal lines are drawn are readout targets (all pixels are to be read out, so all pixels have diagonal lines drawn through them). Normally, OB (optical black) pixels or the like that are shielded from light and that detect a black level are also arranged, and these OB pixels are also read out; however, because these complicate the explanation, these are omitted from the present embodiment.

FIG. 3B illustrates a timing chart in the case that data of all the pixels of the image sensor is read out, and control is done by controlling the image sensor driving circuit 124 by the CPU 121 and sending a pulse to the image sensor. Operation of readout of all the pixels will be explained using FIG. 3B.

Firstly, the vertical scanning circuit is driven, and V0 is activated. At this time, the outputs of the pixels in the $0^{th}$ row are each output to the respective vertical output line. In this state, a MEM signal is activated, and the data of each pixel is sample-held in the line memory unit. Next, PHST is activated, the shift blocks of PH1 and PH2 are input, H0 to Hm−1 are sequentially activated, and the pixel signals are output to the horizontal output line. The output pixel signals are output through the amp 207 as VOUT and converted to digital data by an unshown A/D converter, and predetermined image processing is executed in the image processing circuit 125. Next, in the vertical scanning circuit, V1 is activated, the pixel signals of the first row are output to the vertical output lines, and the pixel signals are similarly temporary stored in the line memory by a MEM signal. PHST is activated, the shift blocks of PH1 and PH2 are input, H0 to Hm−1 are sequentially activated, and the operation to output the pixel signals to the horizontal output line is the same. Readout to the n−$1^{th}$ row is sequentially executed in the above manner.

FIGS. 4A and 4B are diagrams explaining an example of thinning and readout of the image sensor in FIG. 2. FIG. 4A is a portion illustrating the arrangement of m×n photoelectric converters, and is the same image sensor as in FIG. 3A. Pixel units through which diagonal lines are drawn are target pixels for readout during thinning and readout. In the present embodiment, ⅓ of the pixels are thinned and read out for both X and Y.

FIG. 4B illustrates a timing chart during thinning and readout, and a thinning and readout operation will be explained using the timing chart in FIG. 4B. Thinning and readout setting is executed by activating the SKIP terminal of the horizontal scanning circuit 206. The operation of the horizontal and vertical reading circuits is changed from sequential scanning of each pixel to sequential scanning of every three pixels by activating the SKIP terminal. The specific method thereof is well-known technology, and details are omitted.

During this thinning operation, firstly, the vertical scanning circuit is driven, and V0 is activated. At this time, the output of the $0^{th}$ pixel is output to each respective vertical output line. In this state, a MEM signal is activated, and data of each pixel is sample-held in a line memory unit. Next, PHST is activated, and the shift blocks of PH1 and PH2 are input. At this time, the shift register path is changed by setting the SKIP terminal to active, and pixel signals of each set of three pixels are sequentially output to the horizontal output line as H0, H3, H6, . . . , Hm−3. The output pixel signals are output through the amp 207 as VOUT, converted to digital data by an unshown A/D converter, and undergo predetermined image processing in the image processing circuit 125. Next, similarly to the horizontal scanning circuit, the vertical scanning circuit skips V1 and V2, activates V3, and outputs the pixel signals of the third row to the vertical output line. After that, the pixel signal is temporarily stored in the line memory as a MEM signal. PHST is activated, the shift blocks of PH1 and PH2 are input, H0, H3, H6, . . . , Hm−3 are sequentially activated, and the operation to output the pixel outputs to the horizontal output line is the same. In the aforementioned manner, readout up to the n−$3^{rd}$ row is sequentially executed. In the aforementioned manner, ⅓ thinning and readout is executed both horizontally and vertically.

FIGS. 5A, 5B, 6A, and 6B are figures explaining the structures of imaging pixels (a first pixel group that outputs a first image signal for image generation) and focus detection pixels (a second pixel group that outputs a second signal for phase difference detection). The present embodiment adopts a Bayer array in which of four pixels arranged in 2 rows×2 columns, two pixels having G (green) color sensitivity are arranged diagonally, and one pixel each having R (red) and B (blue) color sensitivity are arranged in the other two pixels. Focus detection pixels are arranged to be distributed according to a predetermined rule within the Bayer array.

Figures 5A, 5B:
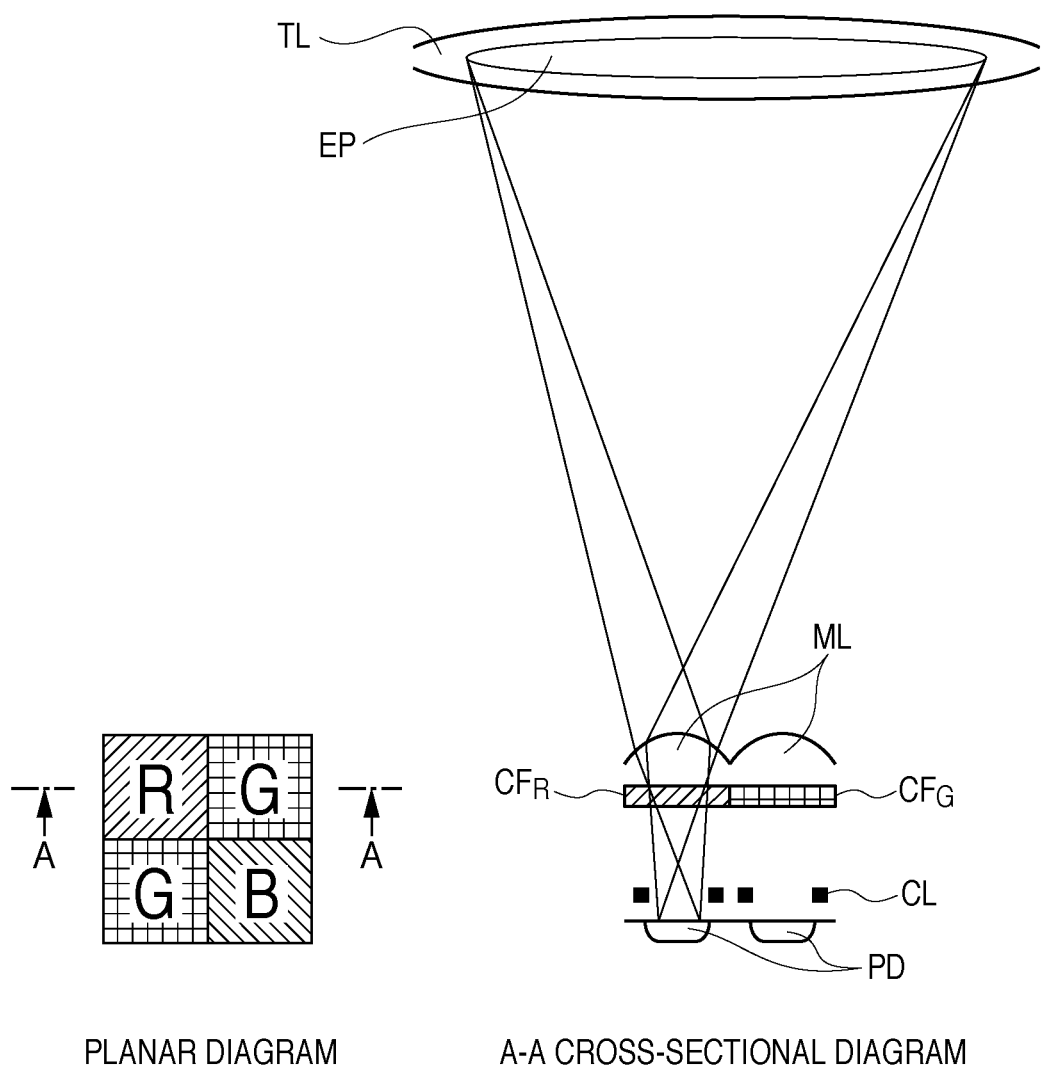
FIGS. 5A, 5B are a planar diagram and cross-sectional diagram of imaging pixels of an image sensor of an embodiment of the present invention.

FIGS. 5A and 5B illustrate the position and structure of the imaging pixels. FIG. 5A is a planar diagram of 2×2 imaging pixels. As is well-known, in a Bayer array, G pixels are arranged to be diagonal to each other, while R and B pixels are arranged in the other two pixels. This 2 row×2 column structure is repeatedly arranged. The cross-sectional plane A-A in FIG. 5A is shown in FIG. 5B. Reference numeral ML is an on-chip microlens arranged on the front-most surface of each pixel, while reference numeral CFR is an R (Red) color filter, and reference numeral CFG is a G (Green) color filter. Reference numeral PD is a pattern representation of a photoelectric converter of a CMOS sensor explained using FIG. 3A, and reference numeral CL is a wiring layer for forming a signal line that transfers various signals within the CMOS sensor. Reference numeral TL is a pattern representation of an imaging optical system.

Here, the on-chip microlens ML and photoelectric converter PD of an imaging pixel are comprised such that a light beam that passes through the imaging optical system TL can be taken in as effectively as possible. In other words, the projection pupil EP and photoelectric converter PD of the imaging optical system TL have a conjugate function by the microlens ML, and the effective area of the photoelectric converter is designed to be a large area. Also, although a light beam incident to the R pixel is explained in FIG. 5B, the G pixels and B (Blue) pixel have the same structure. Therefore, the projection pupil EP corresponding to each RGB pixel for imaging has a large diameter, a light beam from an object can be efficiently taken in, and the S/N of the image signal is improved.

Figures 6A, 6B:
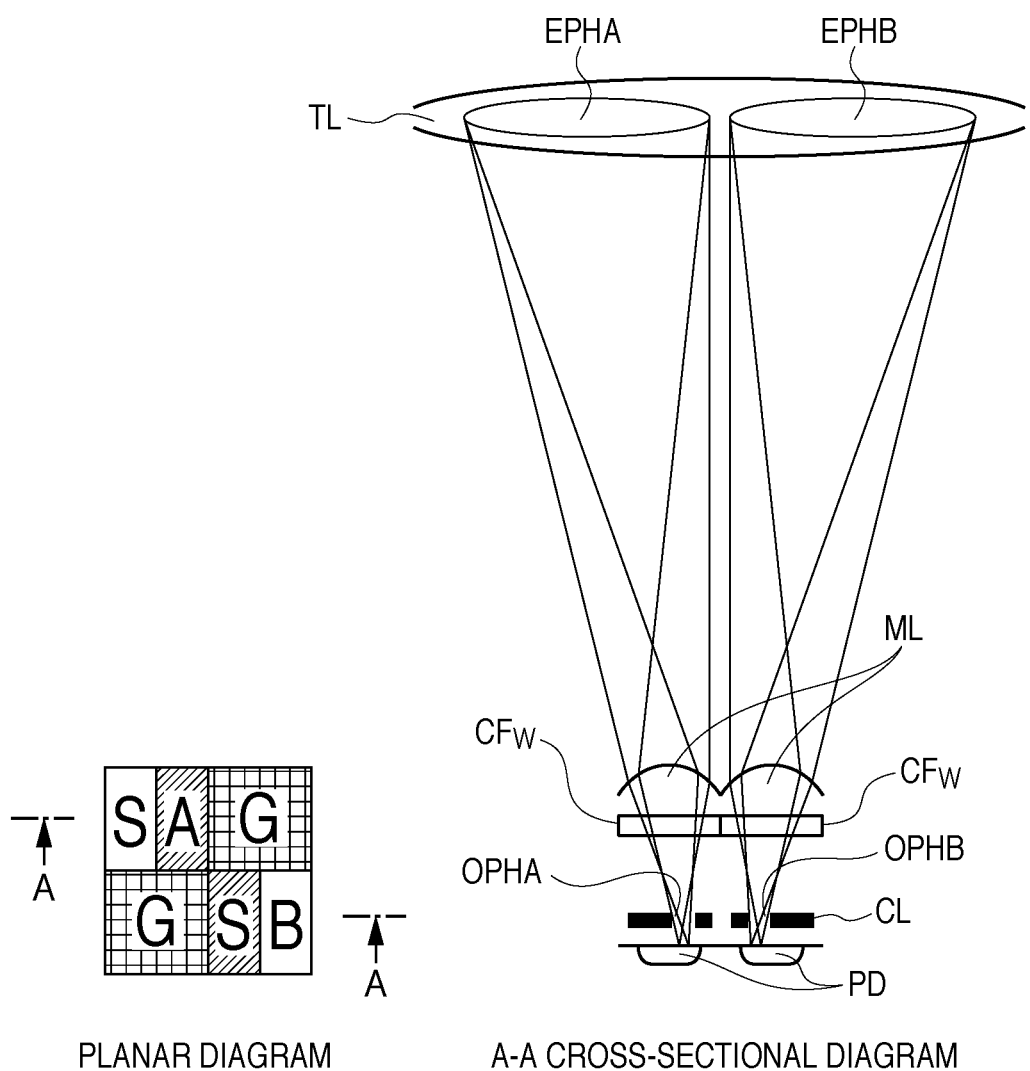
FIGS. 6A, 6B are a planar diagram and cross-sectional diagram of focus detection pixels of an image sensor of an embodiment of the present invention.

FIGS. 6A and 6B illustrate the position and structure of focus detection pixels for executing pupil splitting (pupil region splitting) in the horizontal direction of the imaging lens. FIG. 6A is a planar diagram of pixels of 2 rows×2 columns including focus detection pixels. In the case that an imaging signal is obtained, the G pixels form the main component of the luminosity information. Because the image recognition characteristics of a human are sensitive to luminosity information, deterioration in image quality can be easily recognized if the green pixels are lost. On the other hand, although the R or B pixels obtain color information, a human is not sensitive to the color information, and deterioration in image quality cannot easily be noticed even if a pixel that obtains color information is slightly lost. Therefore, in the present embodiment, of the pixels of 2 rows×2 columns, the G pixels remain as imaging pixels, while the R and B pixels become the focus detection pixels. These are shown by SA and SB in FIG. 6A.

The cross-sectional plane A-A in FIG. 6A is shown in FIG. 6B. The microlens ML and photoelectric converter PD have the same structure as the imaging pixels shown in FIG. 5B. Because the signals of the focus detection pixels are not used in image generation in the present embodiment, a transparent film CFW (White) is arranged in place of a color filter for color separation. Also, the opening portion of the wiring layer CL is biased in a single direction with respect to a central line of the microlens ML in order to execute pupil splitting with an image sensor. Specifically, because the pixel SA and opening portion EPHA thereof are biased toward the right side, a light beam that passes through the projection pupil EPHA on the left side of the imaging lens TL is received. Similarly, because the opening portion OPHB of the pixel SB is biased toward the left side, a light beam that passes through the projection pupil EPHB on the right side of the imaging lens TL is received. Therefore, the pixel SA is regularly arranged in the horizontal direction, and an object image obtained by this group of pixels is an A image. Also, the pixel SB is also regularly arranged in the horizontal direction, and an object image obtained by this group of pixels is a B image, and it is possible to detect the amount of focus variation (amount of defocus) of an object image by detecting the phase difference between the A image and B image. Also, in the case that the amount of focus variation in the vertical direction is to be detected, a structure in which SA and the opening portion OPHA thereof is biased toward to the top, and SB and the opening portion OPHB thereof is biased toward the bottom is possible.

FIG. 7 is a diagram illustrating the arrangement of imaging pixels and focus detection pixels according to the present embodiment. In FIG. 7, G is a pixel coated with a green filter, R is a pixel coated with a red filter, and B is a pixel coated with a blue filter. Also, SA in the figure is a focus detection pixel formed such that the opening portion of the pixel is biased in the horizontal direction, and is a standard pixel group for detecting the amount of image variation in the horizontal direction from an SB pixel group to be described later. Also, SB is a pixel formed such that the opening portion of the pixel is biased in the direction opposite to the SA pixel, and is a reference pixel group for detecting the amount of image variation in the horizontal direction from the SA pixel group. The diagonal line portions of the SA and SB pixels illustrate the opening portions of the biased pixels.

Also, although the focus detection pixel group has a focus detection pixel arrangement, in consideration of the inability to use them for imaging, they are discretely arranged at moderate intervals in the X and Y directions in the present embodiment. Also, in order to prevent the image deterioration from becoming noticeable, it is desirable that arrangement is not done in a G pixel portion. In the present embodiment, five pairs of SA pixels and SB pixels are arranged in a block of 24×24 pixels shown by a thick black frame in the figure. BLOCK_N(i,j) written in the figure represents the block name, and a pixel arrangement pattern is completed by one block. Furthermore, expansion to an entire image screen may be done by arranging block units at arbitrary positions in the image sensor as needed.

The operation of the present embodiment in a system with the aforementioned structure will be explained using FIG. 8 to FIG. 10C.

Figure 8:
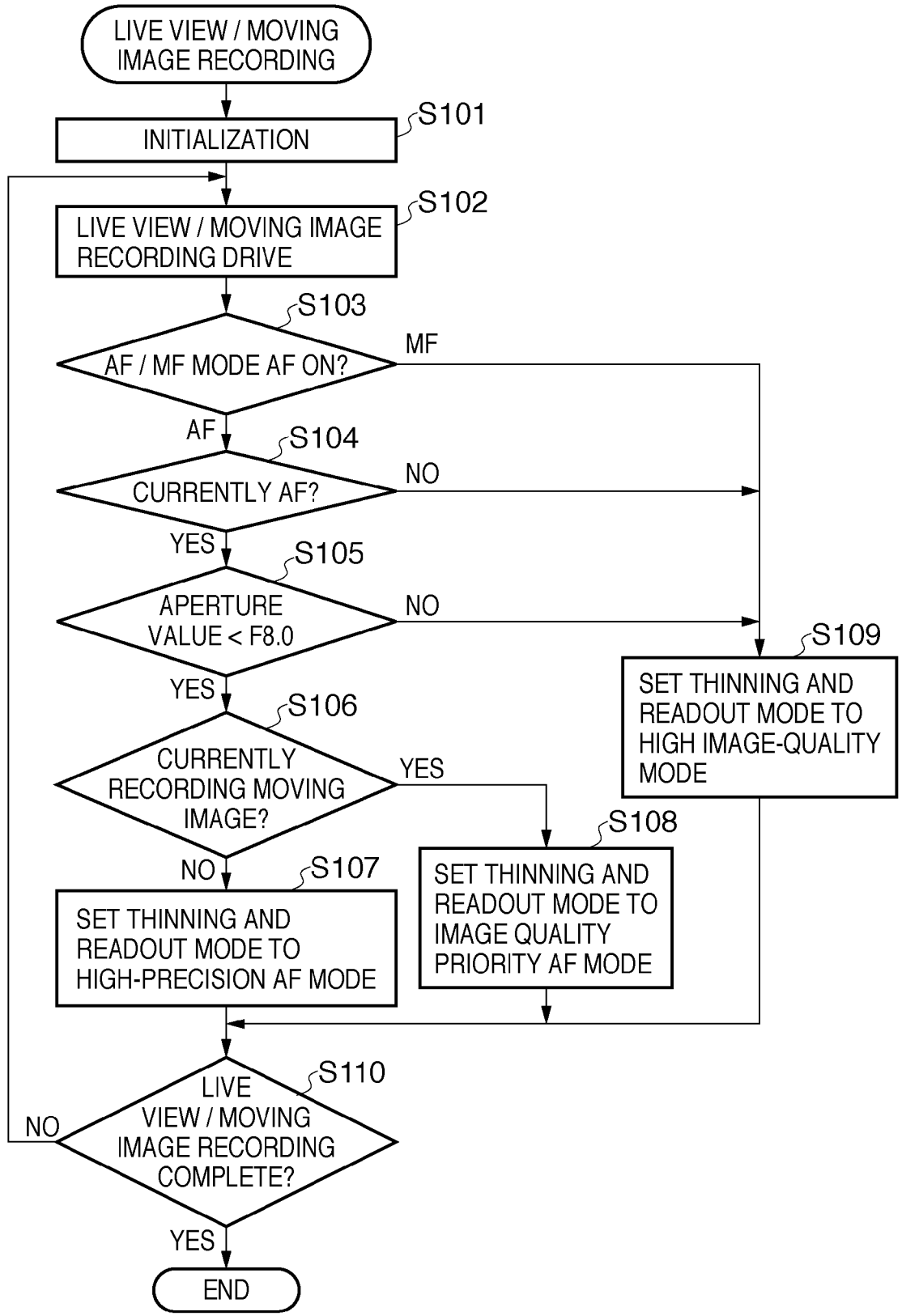
FIG. 8 is an explanatory diagram illustrating the operational flow of an embodiment of the present invention.

In step S101 in FIG. 8, when live view (or moving image recording) is begun, each live view control parameter is initialized, and the process transitions to step S102. In step S102, a so-called live view operation that continuously reads out signals from the image sensor and executes sequential display or recording is executed. Here, readout control of image signals for live view operation and moving image recording will be explained.

Figure 9:
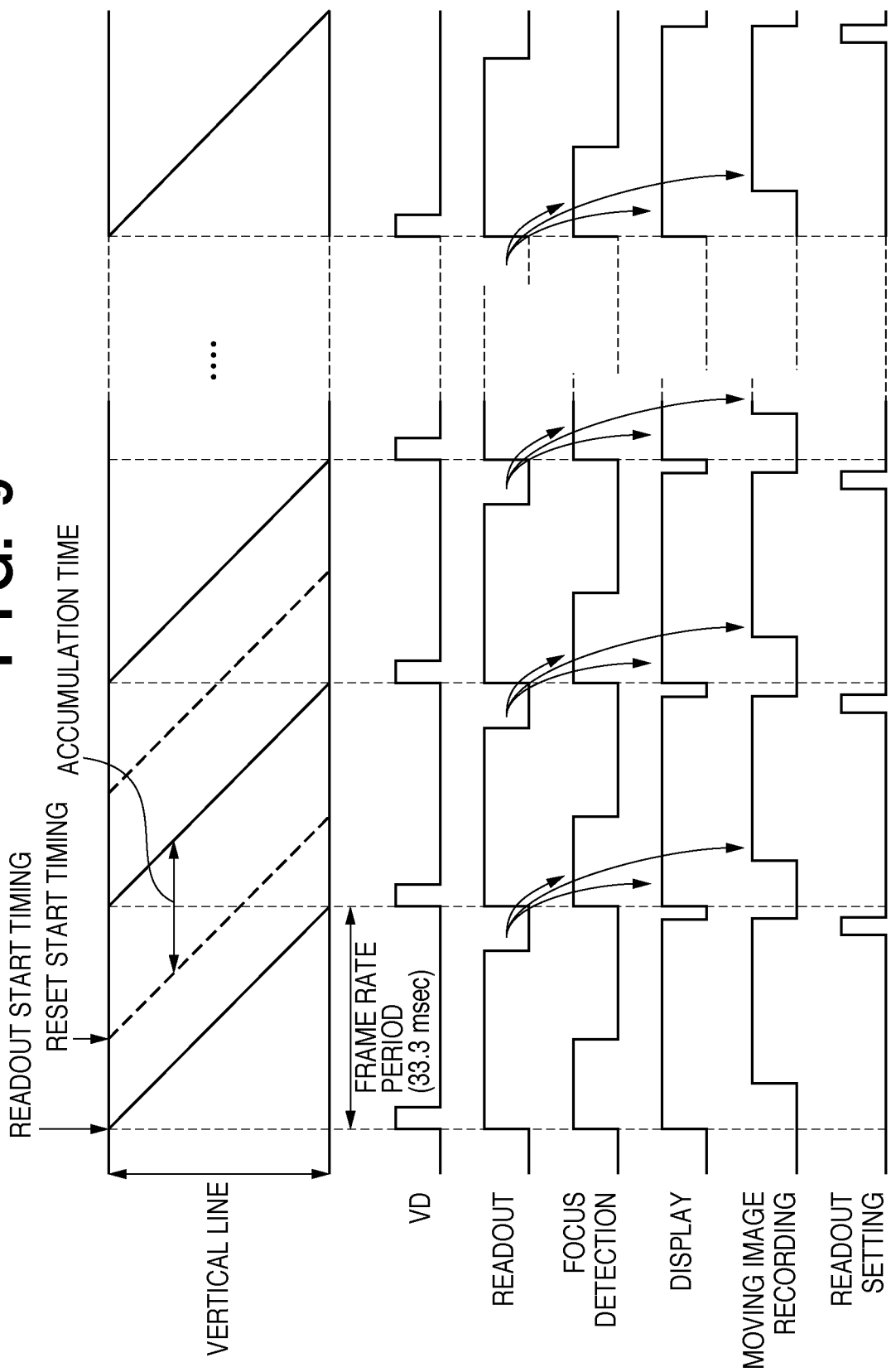
FIG. 9 is a timing charge illustrating an imaging operational sequence during live view of an embodiment of the present invention.

FIG. 9 is a timing chart that explains the overall imaging operation sequence during live view of the present embodiment. As shown in FIG. 9, in an image sensor 107, after an exposure operation has been executed, accumulated charge in each pixel within the image sensor 107 is read out as an image signal. This readout operation is executed in synchronization with a vertical synchronization signal VD, which is a control pulse, and an unshown horizontal synchronization signal HD. The VD signal is a signal that represents one frame of an image, and in the present embodiment, a command is received from a CPU 121 every 1/30 sec (therefore, in the present embodiment, explanation will be given under the assumption that a moving image is captured at 30 frames per second), for example, and is sent to the image sensor 107 by an image sensor driving circuit 124. Also, the control pulse HD is a horizontal synchronization signal of the image sensor 107, and horizontal line control is executed by sending a number of pulses according to the number of horizontal lines at predetermined intervals during the period of one frame. Also, pixel reset is executed for each horizontal line such that a set accumulation time is reached in synchronization with the horizontal pulse HD (shown by a dotted line in the figure).

When accumulation readout is executed by a VD and HD signal, a VD signal is sent, and accumulation operation of the next frame is begun. Also, the read out image signal is transferred to the image processing circuit 125, defective pixel interpolation or the like is executed, image processing is executed, and the image is sent to a display unit 131 installed on the rear surface of the camera or the like. Because the aforementioned matter is a well-known technique, further explanation will be omitted. Also, regarding moving image recording, after the read out signal similarly undergoes image processing, it is sent to a flash memory 133 and sequentially recorded. Also, in the image sensor 107 of the present embodiment, in addition to the imaging pixels, a pupil splitting function is provided to a portion of the pixel group, and so-called phase difference AF is possible. This focus detection pixel is considered to be a defective pixel, defect interpolation is executed, image processing is done, and transfer to a display circuit is done.

Furthermore, focus detection pixel data included in the image data is picked up and transferred to an unshown phase difference detection block in the image processing circuit 125, in order to detect the focus condition of the imaging lens. Next, correlation computation of the pupil-divided SA pixel group and SB pixel group is executed in this circuit block, and a phase difference AF evaluation value is computed. By this, the CPU 121 controls the focus driving circuit 126, operates the focus actuator 114, and executes focus adjustment of the imaging lens. Also, light measurement is executed by a light measurement detection means comprised of the image processing circuit 125 and CPU 121, and exposure conditions such as accumulation time, gain, and aperture are determined. The CPU 121 drives the aperture by operating the aperture shutter actuator 112 based on the determined aperture value.

Also, in the case that normal live view is executed, it is necessary to thin and read out a signal from the image sensor at high speed in order to realize the target frame rate.

Here, a thinning and readout pattern of the present embodiment will be explained using FIG. 10A to FIG. 10C.

FIG. 10A to FIG. 10C are explanatory diagrams illustrating signals output in the case that thinning and readout is executed from the image sensor at ⅓ in the horizontal direction and ⅓ in the vertical direction, as explained using FIG. 7. Moreover, the figure only shows one block that completes the pixel arrangement pattern in FIG. 7, so as not to complicate the figure. Also, pixels marked with SA, SB, R, G, and B in the figure represent pixels that are read out during thinning and readout, and pixels that do not have a symbol represent pixels that are not read out.

FIG. 10A illustrates a thinning and readout pattern in the image quality priority AF mode (first thinning and readout mode), and signals are read out in periods of three pixels from the first column by thinning by ⅓ in the horizontal direction, and pixel signals in the line shown by the vertical line period 0 are read out by thinning by ⅓ in the vertical direction. Although 64 pixels (8×8 pixels) are read out from one block at this time, one pixel each of the focus detection pixels SA and SB are read out from among those. It is possible to compute the phase difference AF evaluation value by transferring the signals of these focus detection pixels to an unshown phase difference detection block in the image processing circuit 125. Also, the focus detection pixels are treated as defective pixels in the image sensor, and are displayed and output as a recorded image after being interpolated by the image processing circuit 125.

Also, FIG. 10B illustrates a thinning and readout pattern in a high image-quality mode (second thinning and readout mode), and signals are read out in periods of three pixels from the first row by thinning by ⅓ in the horizontal direction, and pixel signals in the line shown by the vertical line period 1 are read out by thinning by ⅓ in the vertical direction. Because the focus detection pixels SA and SB pixels are not read out at this time, it is not possible to obtain an AF evaluation value. On the other hand, because the focus detection pixels are not defective pixels of the image signal with respect to the displayed and recorded image signal, there is no effect on the quality of the image, and it is possible to obtain a signal output with high image-quality.

Furthermore, FIG. 10C illustrates a thinning and readout pattern in a high precision mode, and signals are read out in periods of three pixels from the first row by thinning by ⅓ in the horizontal direction, and pixel signals in the line shown by the vertical line period 2 are read out by thinning by ⅓ in the vertical direction. Although 64 pixels (8×8 pixels) are read out from one block at this time, four pixels each of the focus detection pixels SA and SB are read out from among those. It is possible to compute the phase difference AF evaluation value by transferring the signals of these focus detection pixels to an unshown phase difference detection block in the image processing circuit 125, and focus detection with higher precision compared to the aforementioned image quality priority AF mode is possible. On the other hand, because the number of focus detection pixels that become defective pixels of the image sensor is large compared to the aforementioned image quality priority AF mode, the effect on image quality becomes large.

Here, switching between thinning and readout patterns will be explained using step S103 to step S109 in FIG. 8.

In step S103, selection of the thinning readout mode is executed in accordance with the state of the AF and MF switches arranged on an unshown lens or camera. When MF is selected, the process transitions to step S109, and the thinning readout mode is set to the high image-quality mode. When AF is selected, the process transitions to step S104. Here, AF/MF mode switching may be semi-automatically done by a menu or by moving a focus adjusting ring, and is not limited to a physical switch.

In step S104, thinning readout mode selection is done in accordance with whether or not an automatic focus adjustment function (AF) is in operation or not (operational condition). In the case that AF is not being executed, the process transitions to step S109, and the thinning readout mode is set to the high image-quality mode. In the case that AF is being executed, the process transitions to step S105.

In step S105, thinning readout mode selection is done in accordance with the state of the aperture set as the current exposure control. This is because when the aperture is narrowed beyond a predetermined amount, the desired amount of light does not reach the focus detection pixels SA and SB, which is not conducive to focus detection. In the case that the aperture is narrowed beyond F8.0, the process transitions to step S109 and the thinning readout mode is set to the high image-quality mode, and in the case that the aperture is controlled to be on the open side of F8.0, the process transitions to step S106. Although the threshold aperture amount was given as F8.0 here, there is no limitation to this.

In step S106, thinning readout mode selection is done depending on whether or not a moving image is being recorded. In the case that a moving image is being recorded, the process transitions to step S108, and the thinning readout mode is set to the image quality priority AF mode. In the case that a moving image is not being recorded (live view is in operation), the process transitions to step S107, and the thinning readout mode is set to the high-precision AF mode. This is based on the fact that image quality is more important during moving image recording than during live view, and in live view, focus detection precision necessary for a still image as a preview image for still image capture is important. Also, during moving image recording, the thinning readout mode may be set to the high image-quality mode, and the focus detection pixels may not be read out.

In step S110, when notification is given that live view and moving image recording are complete, the camera transitions to a standby state after end processing for live view and moving image recording is executed. On the other hand, in the case that no completion notification is given, the process continues to transition to step S102, and live view and moving image recording processing is continued.

Moreover, although the pixel ratio of the focus detection pixels that are read out during thinning and readout with respect to the normal imaging pixels is 0% in the high image-quality mode, 3.125% in the image quality priority AF mode, and 12.5% in the high-precision AF mode in the present embodiment, there is no limitation to this, and it goes without saying that the combination ratio may be arbitrarily adjusted.

Also, although there are three types of thinning and readout modes in the present embodiment, there is no limitation to three types, and there may be four or more types.

Also, although the thinning ratio was ⅓ in the horizontal direction and vertical direction in the present embodiment, this is not limited to ⅓. This may also be changed in accordance with the thinning and readout mode.

An example in which the thinning ratio is changed in accordance with the thinning and readout mode, and readout of the focus detection pixels is changed is shown in FIG. 11.

FIG. 11 is a figure illustrating the arrangement of imaging pixels and focus detection pixels in the case that the thinning ratio is changed in accordance with the thinning and readout mode, and readout of the focus detection pixels is changed. In FIG. 11, G is a pixel coated with a green filter, R is a pixel coated with a red filter, and B is a pixel coated with a blue filter. Also, SA in the figure is a pixel for focus detection formed with the opening of the pixel portion biased in the horizontal direction, and is a standard pixel group for detecting the amount of image deviation in the horizontal direction from the aforementioned SB pixel group. Furthermore, SB is a pixel formed with the opening portion of the pixel biased in the opposite direction to the SA pixel, and is a reference pixel group for detecting the amount of image deviation in the horizontal direction from the SA pixel group. The diagonal line portion of the SA and SB pixels illustrate the opening portions of the biased pixels.

Furthermore, in consideration that the focus detection pixel group cannot be used for imaging, the focus detection pixel arrangement in the present embodiment is such that they are discretely arranged on some interval in the X and Y directions. Also, it is desirable that they are not arranged on a G pixel portion so that deterioration of the image is not noticeable. In the present embodiment, two pairs of SA pixels and SB pixels are arranged in the block of 30×30 pixels shown by the thick black frame in the figure, and a pixel arrangement pattern is completed in one block. Furthermore, expansion to an entire image screen may be done by arranging block units at arbitrary positions in the image sensor as needed.

Here, in the image sensor comprised of the pixel arrangement shown in FIG. 11, a method of changing the pixel ratio of the focus detection pixels that are read out to the normal imaging pixels by changing the thinning ratio during thinning and readout will be explained using FIG. 12A and FIG. 12B.

Figure 12B:
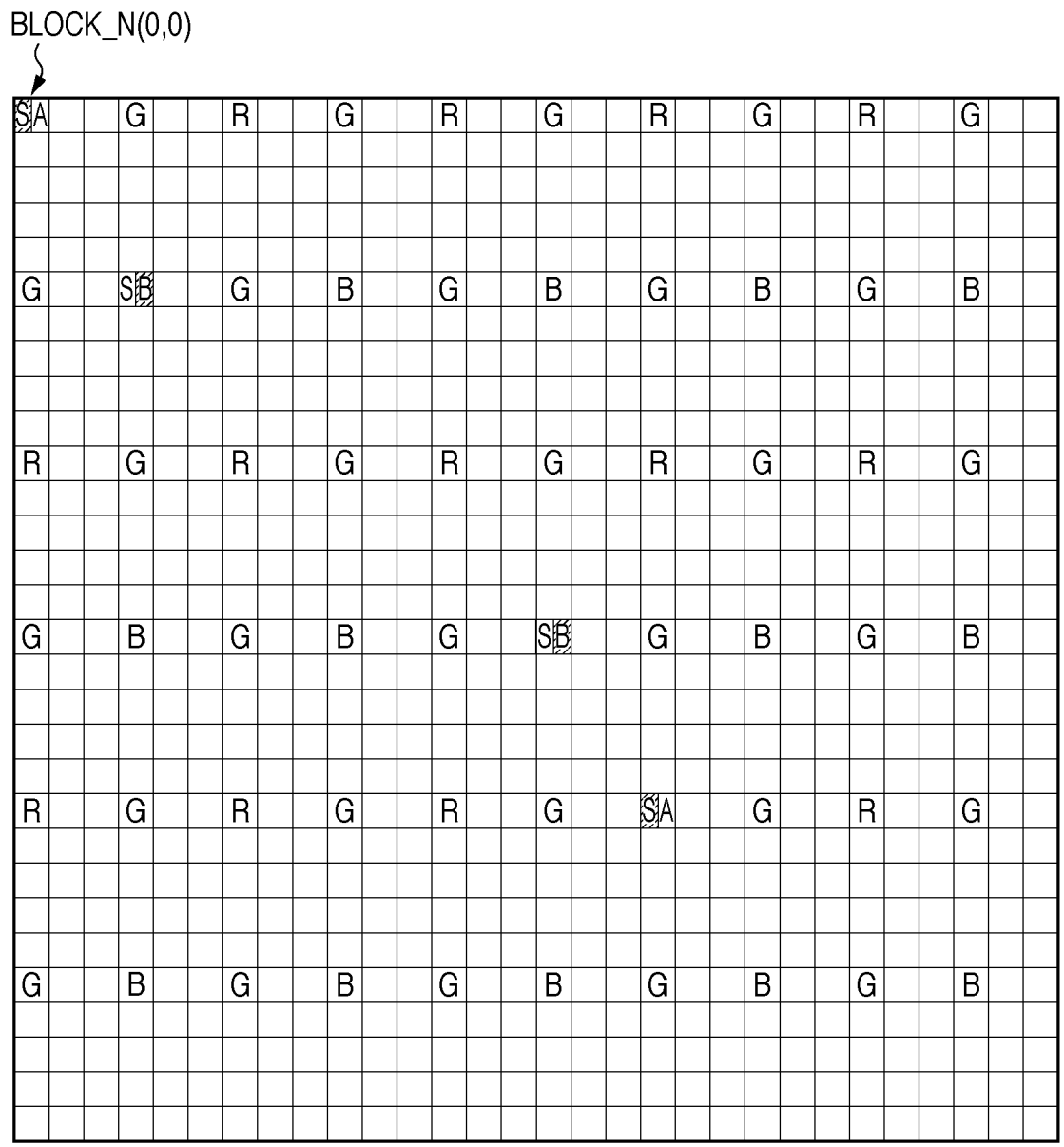
FIG. 12B is an explanatory diagram illustrating a thinning and readout pattern of an embodiment of the present invention.

FIG. 12A and FIG. 12B are explanatory diagrams illustrating signals output in the case that thinning and readout is executed in the horizontal direction and vertical direction from the image sensor explained using FIG. 11. Moreover, in the figure, only one block that completes an image arrangement pattern in FIG. 11 is shown so as not to complicate the figure. Also, pixels marked with SA, SB, R, G, and B in the figure represent pixels that are read out during thinning and readout, and pixels that do not have a symbol represent pixels that are not read out. FIG. 12A shows a thinning and read out pattern in the image quality priority AF mode, and signals are read out in periods of three pixels from the first column by thinning by ⅓ in the horizontal direction, and pixel signals are read out in periods of three lines from the first row by thinning by ⅓ in the vertical direction. Although 100 pixels (10×10 pixels) are read out from one block at this time, one pixel each of the focus detection pixels SA and SB are read out from among these. It is possible to compute the phase difference AF evaluation value by transferring the signals of these focus detection pixels to an unshown phase difference detection block in the image processing circuit 125. Also, the focus detection pixels are treated as defective pixels in the image sensor, and are displayed and output as a recorded image after being interpolated by the image processing circuit 125.

Furthermore, FIG. 12B shows a thinning and readout pattern in the high-precision AF mode, and signals are read out in periods of three pixels from the first column by thinning by ⅓ in the horizontal direction, and pixel signals are read out in periods of five lines from the first line by thinning by ⅕ in the vertical direction. Although 60 pixels (6×10 pixels) are read out from one block at this time, two pixels each of the focus detection pixels SA and SB are read out from among those. It is possible to compute the phase difference AF evaluation value by transferring the signals of these focus detection pixels to an unshown phase difference detection block in the image processing circuit 125, and focus detection with higher precision compared to the aforementioned image quality priority AF mode is possible. On the other hand, because the number of focus detection pixels that become defective pixels of the image sensor is large compared to the aforementioned image quality priority AF mode, the effect on image quality becomes large.

As explained above, when thinning and reading out during live view or moving image recording, it is possible to change the ratio of focus detection pixels included in the read out pixel signals by changing the thinning and read out line period and thinning ratio in accordance with the state of the camera. For this reason, it is possible to simply execute appropriate readout control without causing unnecessary deterioration in image quality.

Furthermore, it is possible to execute an AF operation without interrupting live view display or moving image recording by interpolating the focus detection pixels and generating an image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-026688, filed Feb. 6, 2009, which is hereby incorporated by reference herein in its entirety.

The invention claimed is:

1. An image capturing apparatus comprising:
an image sensor in which a plurality of pixels are two-dimensionally arrayed in the horizontal direction and vertical direction, and that has (a) a first pixel group that photoelectrically converts an object image formed by an imaging lens to a first signal for image generation, and (b) a second pixel group that photoelectrically converts an object image from a split pupil region of the imaging lens to a second signal for phase difference detection;
a focus adjusting unit that detects the focus state of the imaging lens based on the second signal from the second pixel group and executes focus adjustment of the imaging lens;
a readout unit that has (a) a first thinning and readout mode, wherein the readout unit thins and reads out signals from the second pixel group, and (b) a second thinning and readout mode, wherein the readout unit thins and reads out signals from the second pixel group with a different thinning ratio from the first thinning and readout mode;
a display control unit that controls a display device so as to display the image based on the output from the image sensor;
a detection unit that detects whether or not an operation to record a moving image output from the image sensor is performed while the display unit displays the image output from the image sensor; and
a selecting unit that selects in which mode to operate the readout unit from among the first thinning and readout mode and the second thinning and readout mode in accordance with the detection of the record detection operation.

2. The image capturing apparatus according to claim 1, wherein the operational condition of the focus adjusting unit changes from a first mode to a second mode in accordance with the result of the selection by the selecting unit.

3. The image capturing apparatus according to claim 1, wherein a moving image recording unit that sequentially records an image signal read out from the image sensor is further provided, and the selecting unit selects in which mode to operate the readout unit from among the first thinning and readout mode and the second thinning and readout mode in accordance with the state of whether or not the moving image recording unit is recording a moving image.

4. The image capturing apparatus according to claim 1, wherein the selecting unit is configured to perform selecting in which mode to operate the readout unit from among the first thinning and readout mode and the second thinning and readout mode in accordance with the state of an aperture provided on the imaging lens.

5. The image capturing apparatus according to claim 1, wherein the first thinning and readout mode thins and reads out signals from the plurality of pixels arranged in the horizontal direction and vertical direction at a predetermined thinning ratio and thinning phase, and
wherein the second thinning and readout mode thins and reads out signals from the plurality of pixels with a difference in at least one of the thinning ratio and the thinning phase from the first thinning and readout mode.

6. The image capturing apparatus according to claim 1, wherein the first thinning and readout mode thins and reads out signals from the first pixel group, and
wherein the second thinning and readout mode thins and reads out signals from the first pixel group with a difference in thinning ratio from the first thinning and readout mode.

* * * * *